(12) United States Patent
Morizur et al.

(10) Patent No.: US 10,382,133 B2
(45) Date of Patent: Aug. 13, 2019

(54) MULTIMODE OPTICAL FIBER COMMUNICATION DEVICE COMPRISING A COMPONENT FOR MODAL DISPERSION COMPENSATION

(71) Applicant: CAILabs, Rennes (FR)

(72) Inventors: Jean-François Morizur, Boulogne-Billancourt (FR); Nicolas Barre, Rennes (FR)

(73) Assignee: CAILabs, Rennes (FR)

( * ) Notice: Subject to any disclaimer, the term of this patent is extended or adjusted under 35 U.S.C. 154(b) by 0 days.

(21) Appl. No.: 16/082,839

(22) PCT Filed: Mar. 9, 2017

(86) PCT No.: PCT/FR2017/050530
§ 371 (c)(1),
(2) Date: Sep. 6, 2018

(87) PCT Pub. No.: WO2017/158261
PCT Pub. Date: Sep. 21, 2017

(65) Prior Publication Data
US 2019/0097723 A1    Mar. 28, 2019

(30) Foreign Application Priority Data

Mar. 15, 2016 (FR) ...................... 16 52142

(51) Int. Cl.
*H04B 10/548* (2013.01)
*H04B 10/2525* (2013.01)
(Continued)

(52) U.S. Cl.
CPC ..... *H04B 10/2581* (2013.01); *H04B 10/2525* (2013.01); *H04B 10/2543* (2013.01);
(Continued)

(58) Field of Classification Search
CPC ............ H04B 10/2581; H04B 10/2525; H04B 10/2543; H04B 10/548; G03H 1/12; G03H 2001/0458; H04J 14/04
(Continued)

(56) References Cited

U.S. PATENT DOCUMENTS 3,759,590 A * 9/1973 Arnaud .................... G02B 6/10
359/434
3,832,030 A * 8/1974 Gloge ..................... G02B 5/001
385/33
(Continued)

FOREIGN PATENT DOCUMENTS

FR    3016973 A1    7/2015

OTHER PUBLICATIONS

Morizur et al., Programmable Unitary Spatial Modes Manipulation, https://hal.archives-ouvertes.fr/hal-00483672/document, Journal of the Optical Society of America, Vo. 27, No. 11, (Nov. 1, 2010), pp. 2524-2531.
(Continued)

*Primary Examiner* — Abbas H Alagheband
(74) *Attorney, Agent, or Firm* — TraskBritt (57) ABSTRACT

An optical phase-shifting component is used for shifting the phase and modifying the intensity of the light beam injected into the fiber (MMF2). The component is inserted upstream or downstream of, or at an intermediate position in, the fiber. The component uses two mirrors and multiple beam paths between the mirrors. An optical phase-shifting structure (e.g., a reflective phase mask with a structured surface, which can be a mirror) is effective at each reflection of the beam and gradually splits the beam into faster and slower propagation modes. The faster modes are subjected to one or more reflections more than the slower modes and are thereby decelerated. The fast and slow modes are combined again
(Continued)

and are then transmitted in a multimode fiber in which the modes have different propagation speeds. The difference in the propagation speeds is thus at least partly compensated.

10 Claims, 3 Drawing Sheets

(51) Int. Cl.
　　　*H04B 10/2543*　　(2013.01)
　　　*H04B 10/2581*　　(2013.01)
　　　*H01S 3/13*　　　　(2006.01)
　　　*H04B 10/00*　　　(2013.01)
　　　*G02B 6/14*　　　　(2006.01)

(52) U.S. Cl.
　　　CPC ............. *H04B 10/548* (2013.01); *G02B 6/14* (2013.01); *H01S 3/13* (2013.01); *H04B 10/12* (2013.01)

(58) Field of Classification Search
　　　USPC .......................... 398/143, 141; 385/147, 121
　　　See application file for complete search history.

(56) References Cited

U.S. PATENT DOCUMENTS

| | | | |
|---|---|---|---|
| 4,050,782 A * | 9/1977 | Uchida | G02B 6/14 385/147 |
| 4,571,080 A * | 2/1986 | Papuchon | G01C 19/72 356/477 |
| 7,555,024 B2 * | 6/2009 | Ishaaya | H01S 3/07 372/101 |
| 7,933,301 B2 * | 4/2011 | Ishaaya | H01S 3/07 372/101 |
| 9,871,948 B2 * | 1/2018 | Papadopoulos | G02B 23/26 |
| 9,952,385 B2 * | 4/2018 | ten Have | G02B 6/14 |
| 2002/0131050 A1 * | 9/2002 | Pepper | H04B 10/60 356/502 |
| 2010/0329671 A1 * | 12/2010 | Essiambre | G02B 6/14 398/44 |
| 2012/0224861 A1 * | 9/2012 | Winzer | G02B 6/14 398/143 |
| 2013/0068937 A1 * | 3/2013 | Ryf | G02B 6/4206 250/227.11 |
| 2014/0161390 A1 * | 6/2014 | Winzer | G02B 6/14 385/28 |
| 2015/0253197 A1 * | 9/2015 | Okamoto | G01J 9/0215 398/28 |
| 2016/0085024 A1 * | 3/2016 | Fontaine | G02B 6/04 398/65 |
| 2016/0124151 A1 * | 5/2016 | ten Have | G02B 3/08 385/24 |
| 2017/0045687 A1 * | 2/2017 | Awaji | G02B 6/32 |
| 2017/0153440 A1 * | 6/2017 | Caravaca-Aguirre | G02B 23/2469 |
| 2018/0259317 A1 * | 9/2018 | Tearney | G01B 9/02091 |

OTHER PUBLICATIONS

Labroille et al., Efficient and Mode Selective Spatial Mode Multiplexer Based on Multi-Plane Light Conversion, https://arxiv.org/pdf/1404.6455.pdf, Optics Express, (Jun. 30, 2014), vol. 22, No. 13, p. 15599.

International Written Opinion for International Application No. PCT/FR2017/050530 dated Jun. 6, 2017, 7 pages.

International Search Report for International Application No. PCT/FR2017/050530 dated Jun. 6, 2017, 3 pages.

* cited by examiner

MULTIMODE OPTICAL FIBER COMMUNICATION DEVICE COMPRISING A COMPONENT FOR MODAL DISPERSION COMPENSATION

CROSS-REFERENCE TO RELATED APPLICATIONS

This application is a national phase entry under 35 U.S.C. § 371 of International Patent Application PCT/FR2017/050530, filed Mar. 9, 2017, designating the United States of America and published as International Patent Publication WO 2017/158261 A1 on Sep. 21, 2017, which claims the benefit under Article 8 of the Patent Cooperation Treaty to French Patent Application Serial No. 1652142, filed Mar. 15, 2016.

TECHNICAL FIELD

The application relates to optical fiber communications.

BACKGROUND

In many communication networks using optical fibers that transmit digital information by amplitude modulation of a usually infrared light beam, so-called multimode optical fibers are used. Unlike single-mode fibers that have a core with a very small diameter and that spread light in a single mode, which is the fundamental mode, multimode fibers have a core with a larger diameter and can propagate light simultaneously in several propagation modes. The propagation modes energized in the fiber are characterized by electric field phase and intensity spatial profiles in a plane transverse to the propagation axis; such profiles are different, depending on the modes, and several modes can co-exist. Multimode fibers are advantageous in that they can transmit more power than a single-mode fiber when the beam applied to the inlet has several modes; a single-mode fiber would just eliminate the energy supplied in the modes other than the fundamental mode. Moreover, connecting multimode fibers with each other or with other components, including sources and receivers, is easier, because of the larger diameter of their cores: side positioning and angular alignment tolerances are more flexible. These fibers are compatible with those of laser radiation sources that are themselves multimode ones, like the Vertical Cavity Surface-Emitting semiconductor laser diodes (VCSEL), which are the sources easiest to industrially manufacture.

But multimode fibers have a drawback, which is modal dispersion: several modes can simultaneously propagate in the fiber, but the propagation speed of light varies according to the propagation mode. Such discrepancy in the propagation speed is very small but it plays a non-negligible role in long fibers. As a matter of fact, it results, at a remote end of the fiber, in a possible mixing of the digital information, which modulates the intensity of a light beam injected at the other end. A narrow light pulse injected on the source side becomes a spread pulse on the receiver side. For a long fiber, it may happen that one information bit propagated by a slow mode reaches the end of the fiber at the same time as the next bit propagated by a fast mode. Decoding the digital information in the receiver may become difficult, if the pulses are transmitted at high speed and/or if the fiber is long. This results in a bandwidth limited by the modal dispersion; such modal bandwidth limits the maximum data rate that can be reached in the fiber, depending on the length thereof.

This problem has been partly solved by a more sophisticated design of the fibers, so that standard multimode fibers (OM1, OM2, OM3, OM4) exist, which have progressively improved the balancing of the various propagation speeds by optimizing the index profiles of the core of the fiber (step-index or graded-index profiles, or more complex profiles). As an order of magnitude, the limit rate of one 300-meter long fiber OM3 is of the order of 10 Gbit/second, but is reduced to 1 Gbit/second for a 600-meter long fiber and to 100 Mbit/second for a 2,000-meter long fiber.

Improving such speeds in already deployed communication networks, for instance, corporate networks or data centers, or in new networks, is desired. The solution consisting in changing the fibers to replace the same with multimode fibers having a higher standard, or even with single-mode fibers, is an expensive solution, both with regard to hardware (higher standard fibers are more expensive) and set-up time, in existing networks.

One solution already proposed to try to solve such problem consists in installing mode filters to eliminate either the faster modes or the slower modes, while keeping the modes that have speeds in a limited range only. The main drawback is the cost of such filters and, more specifically, the resulting energy loss, since the eliminated modes are, by nature, modes that otherwise transport a part of the radiation energy. Such energy loss, which is added to natural losses in the long fibers, makes the detection of information in the receiver, at the end of the fiber, more difficult.

Other solutions may have been proposed that use improved electronic processing for demodulating the transmitted information, and that specifically use adaptive filters. Solutions using several successive fibers having different properties or several parallel fibers having different properties, or even several cores of fibers having different properties in a single fiber, have also been proposed.

BRIEF SUMMARY

The disclosure describes a different solution to increase the speed enabled by a multimode optical fiber communication system.

The disclosure is based on the use of an optical component making a succession of reflections and passages of the light beam on deformed surfaces, with such passages being followed by unguided propagations of the beam. The surface deformation induces a local phase shift within the beam cross-section. A light beam that propagates within the component thus undergoes a succession of local phase shifts separated by propagations. The light beam thus undergoes a complex transformation during its propagation in the component. The deformations of the surfaces can be so configured as to convert an input light beam, which has a specific amplitude and phase profile, into an output beam, the amplitude and phase profile of which is different. Furthermore, one configuration of deformed surfaces can be found, such that a family of input beams, which all have specific amplitude and phase profiles, is sent by the component to a family of output beams, the amplitude and phase profile of which is given, provided that the requested transformation is unitary, i.e., it preserves the total energy of the beam. The deformed surfaces are formed in an optical phase-shifting structure that comprises sets of very small elementary phase-shifting areas, each acting on the beam portion it receives; such optical phase-shifting structure is gone through by the light beam upon each reflection travel between two mirrors, and it can also consist of one of the mirrors, or even both. During the various travels, the beam encounters different sets of elementary phase-shifting areas and each respective set is configured with a phase-shift pattern that induces a respective intermediate transformation of the spatial profile of the beam. The succession of intermediate transformations (for instance, ten successive transformations or even less) sets a global transformation of the spatial profile of the beam.

The mathematical and physical proof of the existence of such a deformation configuration for any unitary transformation has been exposed in the article by Jean-Francois Morizur et al., "Programmable unitary spatial mode manipulation" in *The Journal of Optical Society of America*, Vol. 27, No. 11, November 2010. The feasibility of such a component has been demonstrated, as well as the universal nature thereof, namely, the ability to perform any unitary transformation of a spatial profile of a coherent light beam.

Such a component has, for example, been proposed in the prior art for multiplexing several input beams. As a matter of fact, a family of input beams, having identical shapes but spatially separated, can be considered, as well as setting, as the target output, a family of superimposed beams, the amplitude and phase profiles of which are so-called orthogonal (so that energy is preserved). The article by Guillaume Labroille et al., "Efficient and mode-selective spatial mode multiplexer based on multi-plane light conversion" in *Optics Express,* 30 Jun. 2014, Vol. 22, No. 13, p. 15599, explains the constitution of such component. The component uses two mirrors and one optical phase-shifting structure that is gone through several times, in different places, by the light beam during the multiple travels thereof between the two mirrors.

According to the disclosure, a multiplexing or demultiplexing function is not desired for receiving several beams or for producing several beams, but a single optical inlet is preserved for a single multimode input beam and a single outlet for a single multimode output beam. The beam is subjected to the progressive spatial profile transformations during the multiple travels in the free space between the two mirrors, transformations that entail the separation of the multimode beam into several modes or groups of modes having different group speeds, with propagation axes of such groups that are gradually split. Such separation results in that the separated groups of modes take different paths between the two mirrors, then a combination of such paths. The phase shifts introduced by the sets of elementary phase-shifting areas of the optical phase-shifting structure are so calculated that the beam portions representative of a mode or a group of modes, the group speeds of which are within a first range of values undergo, because of the deflections conferred on the same by their structure, a number of reflections that is not the same as the number of reflections conferred on other portions of the beam representative of another mode or group of modes having group speeds in another range of values. Because of such number of different reflections, the subsequent recombination of the two beam portions results in a multi-mode beam, wherein the two modes or groups of modes are present, but wherein the fastest mode or group of modes has been delayed because of a larger number of reflections (for instance, one or two reflections more, for a total of ten reflections). Such delay is used to at least approximately compensate the lead that such mode or group of modes takes in the optical fiber relative to the other group.

This is the reason why a new multimode optical fiber information communication device, intended to be inserted between a source of light radiation digitally modulated by the information and a receiver for demodulating such information, is described here, with the device comprising a multimode optical fiber and an optical component for modifying the spatial profile of the light beam positioned upstream or downstream or inserted at an intermediate point of the fiber, with such component comprising:
  an inlet for receiving a multimode light beam,
  a beam outlet,
  at least two mirrors enabling a multiple reflection of the beam between the two mirrors,
  and an optical phase-shifting structure, which may be one of the mirrors and which has several sets of multiple elementary phase-shifting areas, with the individual phase-shifting profiles introduced by the elementary phase-shifting areas in each set generating an intermediate transformation of the spatial profile of the beam after the passage of the beam in such set, and the intermediate transformations generated by several sets that combine, during the passages of the beam on the phase-shifting structure, upon multiple reflections between the mirrors, to form an overall transformation, with the device being characterized in that the overall transformation comprises:
  a) first, a separation of the beam into several modes or groups of propagation modes having group speeds in ranges of different values, with the deflections generated by the sets of phase-shifting areas being such that the beam portions corresponding to a mode or group of modes, the group speeds of which are within a first range of values, undergo, because of such deflections, a number of reflections on the mirrors, which is not the same as the number of reflections conferred on other portions of the beam corresponding to another mode or group of modes having group speeds in another range of values,
  b) then, a combination of the different portions of the beam after these reflections so as to direct the beam toward the component outlet.

The phase shift values of the different areas of a given set are so calculated as to obtain the desired intermediate transformations for the spatial profile of the beam incident on such set of areas, and the different sets establish phase-shifting configurations that correspond to the other intermediate transformations to be achieved. Such intermediate transformations include the deflections of the beam portions separated upon the intermediate transformations and then recombined.

The optical phase-shifting structure may be transmissive or reflective. If it is transmissive, it consists of a transparent plate, the thickness of which is modulated, elementary area per elementary area, according to the phase shift to be punctually achieved. If it is reflective, it is preferably formed by a generally flat mirror having a textured surface to establish the desired punctual phase shifts. Such "generally flat" mirror is then the device phase-shifting structure.

If the structure is reflective, which is preferred, it may be formed by one of the two mirrors. In practice, one of the mirrors can be a flat or spherical mirror and the other one is a textured mirror. The two mirrors may be flat mirrors with textured surfaces.

The optical phase-shifting structure is normally a fixed, static structure (pre-calculated phase shifts for all the elementary regions of all the sets of areas), and such structure is then formed by lithography on a transparent leaf or a plate coated afterward with a reflecting layer such as a layer of gold. The phase-shifting structure could, however, also be, in some particular cases, an electrically controlled structure, for example, a piézo-electrically actuated micro-mirror structure or a liquid crystal matrix array.

In summary, the disclosure makes it possible to increase the speed limit of a multimode optical fiber in an existing facility, or a facility to be created. With regard to the existing facilities, it is compatible with the existing architecture, since adding the optical component for modifying the spatial profile at an upstream or downstream end of an existing fiber is generally sufficient. Such solution also makes it possible to go on using multimode fibers even in geographically extensive data centers (over one kilometer). It makes it possible to reduce the multimode optical fibers design constraints by avoiding modal dispersion to be the major constraint; for example, other properties of the fiber such as losses in the presence of bends or chromatic dispersion can be optimized, with the optical component being used to compensate the modal dispersion.

The solution according to the disclosure is highly integrated (a single compensation housing) and is, therefore, advantageous in this regard, as compared with solutions that would require several components and, specifically, solutions that would require adding compensation optical fibers. Finally, it introduces no significant losses (as compared to solutions that would use a too slow or too fast mode elimination filter).

In addition to an optical fiber transmission device, a method is also disclosed for transmitting information using a multimode optical fiber between a source and a receiver, wherein a light beam spatial profile modification optical component formed as indicated above is inserted, so that the phase-shifting structure can induce the separation of the beam into several modes or groups of propagation modes having group speeds in different ranges of values, upstream, downstream or at an intermediate point of the fiber, with the deflections generated by the sets of phase-shifting areas being such that the beam portions that correspond to a mode or a group of modes, the group speeds of which are within a first range of values undergo, because of such deflections, a number of reflections on the mirrors, which is not the same as the number of reflections conferred on other portions of the beam corresponding to a different mode or a group of modes having group speeds in a different range of values, then a combination of the different portions of the beam after such reflections to direct the beam toward the component output.

BRIEF DESCRIPTION OF THE DRAWINGS

Other characteristics and advantages of the disclosure will become apparent from reading the following detailed description, which is made while referring to the accompanying drawings wherein.

DETAILED DESCRIPTION

The spatial profile modification optical component that will be used is based upon components used in the prior art to modify the spatial profile of a coherent light beam.

For the record, the spatial profile of a light beam is an electric field distribution profile in a beam section transverse to the axis of propagation. This is a profile of complex amplitudes of an electric field that can be represented at any point of the section by one intensity and one phase. For example, the intensity profile would be Gaussian in the case of a beam transmitted by a single-mode fiber energized according to the fundamental mode. The profile is, of course, more complex in the case of a multimode beam and it can be broken down into specific profiles corresponding to each mode.

Figure 1:
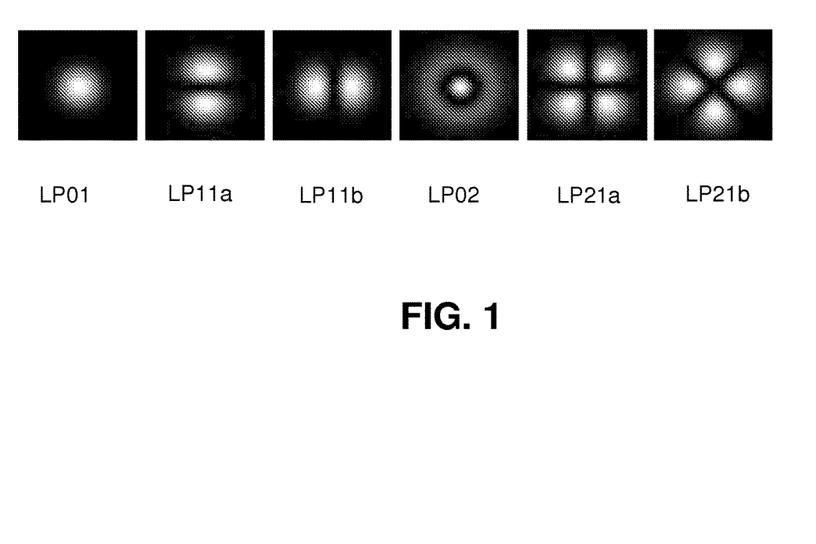
FIG. 1 shows conventional spatial profiles of individual propagation modes in a multimode optical fiber.

The modes of propagation in a multimode fiber are commonly reported in the literature and often designated by letters and numbers that indicate the nature of the mode and the order thereof in two dimensions. Typically, the first order mode or fundamental mode is commonly known by the name LP01; the higher modes are the modes LP11a, LP11b, LP21a, LP21b, LP02, LP03, LP31a, LP31b, etc. Any beam that propagates in a multimode fiber can be broken down on the basis of the modes LP. The technical literature mentions a number of forms of such spatial profiles for the most common modes. Such typical forms are illustrated in FIG. 1 for the first modes LP01, LP11a, LP11b, LP02, LP21a, LP21b. Superior orders, such as LP31, LP41, etc., may, of course, also be present.

The fastest propagating mode is the fundamental mode LP01. Other modes propagate more slowly, first the mode LP11 and the modes LP02 and LP21, and then the other modes. For instance, it may be decided to split such mode into a first group comprising the mode LP01 only and a second group comprising the modes LP11, LP02 and LP21. Or both modes can be split into a first group comprising the mode LP01 and the mode LP11 and a second group comprising the modes LP02 and LP21. Splitting the fiber modes into more than two groups is possible.

The aforementioned article by J. F. Morizur et al. mentions the possibility of transforming the spatial profiles of a family of light beams into any other family of spatial profiles, provided that the thus defined transformation preserves energy, through a succession of intermediate transformations in a free space (unguided), each using an array of phase-shifting elements acting on the section of the light beam that illuminates the matrix. In the article mentioned above, the phase shifting elements are programmable and consist of electrically operable deformable mirrors, but the principle would be the same with a non-programmable mirror plate structured with a fixed, static configuration for a predefined transformation; it would also be the same with a programmable (liquid crystal) or non-programmable transparent plate, so structured as to introduce a phase shifting matrix in the light beam path. The article also shows how any unitary transformation (which preserves energy) of a beam spatial profile may be obtained with the greatest accuracy by using a finite number of intermediate transformations obtained by alternating phase-shifting and optical Fourier transforms structures. If a limit (for instance, ten) is imparted to the number of intermediate transformations, the resulting global transformation will be more approximate. The phase-shifting structures make a point by point modification of the phases in the section of the light beam. The optical Fourier transforms may be lenses or spherical mirrors, but in practice, a single propagation of the beam over a few centimeters in the free space between two phase-shifting structures can replace the optical Fourier transforms in the alternation.

The above article gives a possible solution for designing optical systems based on a succession of phase-shifting structures and free propagation between such structures to perform any spatial profile unitary transformation of a coherent light beam. Another possible solution for the design of the different sets of phase-shifting areas enabling the desired transformation has been described in the patent publication WO 2012/085046, incorporated herein by reference, either to correct a beam that has undergone a transformation profile, or to voluntarily apply a desired profile transformation to a beam. Such design of the various phase-shifting structures, which is faster, more efficient, but less global than the design mentioned in the previous article, is obtained, in practice, by means of a simulation in a computer capable of modeling the behavior of beam profiles in a succession of different optical elements, and specifically phase-shifting structures and free propagation spaces. The computer simulates the passage, in such a succession of optical elements, of a light beam having an input profile, and calculates the resulting output beam. The output beam then interferes with a beam having a desired spatial profile in the plane corresponding to a phase-shifting structure. The result of such interferences on the plane corresponding to each phase-shifting structure is observed and the structural configuration is changed with a view to maximizing the interferences. Such operation is renewed on the successive phase-shifting structures and again by successive iterations over all the structures until an output beam having a profile very close to that of the desired beam is obtained. The final configuration of phase-shifting structures obtained after such iterations is then used to form the spatial profile modifying device, which converts the first profile into any desired second profile.

Transformations consisting in multiplexing several modes of propagation, i.e., a transformation of the spatial profiles of several simple modes into a complex mode combining the spatial profiles of the simple modes, have been proposed in the above-mentioned article by G. Labroille. The component that performs such transformation also makes it possible to perform the reverse transformation (demultiplexing). Rather than using a succession of phase-shifting structures separated by the free propagation spaces, it uses a multiple reflection of the beam between two mirrors and a beam passing each time through the same phase-shifting structure but in different portions thereof, with each portion representing the equivalent of a particular phase-shifting structure.

The optical component, used in the present disclosure, which executes both an internal function of mode separation and mode clustering, is a spatial profile transformation component of a beam constructed according to the principles just described. It performs a transformation of a spatial profile into another spatial profile and such transformation is gradual during several passages (for example, about ten passages) of the beam in an optical phase-shifting structure comprising a matrix of phase-shifting areas. Such multiple passes are obtained by two mirrors between which the beam passes while undergoing multiple reflections, with the beam each time passing in the optical phase-shifting structure at different locations thereof. Such phase-shifting structure may be constituted by one of the mirrors.

In the present disclosure, the optical component is so designed as to transform the multimode spatial profile of the beam into at least two other profiles that gradually split as the beam passes through the phase-shifting structure. One of the profiles corresponds to a mode or a group of modes and the other one corresponds to another mode or another group of modes; the first profile corresponds to faster propagation modes (for instance, the modes LP01 and LP11) and the second profile corresponds to slower propagation modes (for instance LP02 and LP21). The optical component establishes an optical path having a different length for each group of modes so as to lengthen the optical path followed by the faster group of modes. It then recombines, still by means of passages through the phase-shifting structure, the two beam portions (or more than two portions if the original profile has been split into more than two profiles) into a single multimode beam directed toward the component outlet. In such multimode beam, the faster modes are slowed down by a longer optical path in the free space. Such slowing down compensates the slowing down of the slower modes during their passage through the multimode optical fiber connecting the source to the receiver. The paths having a different length and the compensation resulting therefrom are obtained by the fact that the faster propagation modes undergo, between the mirrors, a number of reflections greater than the number of reflections undergone by slower propagation modes, for example, one or two reflections more for a total of a dozen reflections. This is possible because the phase-shifting structure gives the different modes or groups of modes different deflections, thus increasing the separation of the beam portions having different groups of modes. The simplest separation is a progressive divergence of the propagation axes of the different portions of the beam. A separation may also be considered while keeping the same axis of propagation, for example, a separation of the spatial profile of the beam into two different areas, clearly separated from each other and each containing half of the beam energy; it may, for example, be a separation into two geographically separated lobes, or into a beam central region geographically separated from an annular area surrounding same; then the two portions of the beam are then separated (for instance, by means of a mirror reflecting the two lobes or the two concentric areas on separate paths) and they are directed so as to undergo different numbers of reflections. Designing the different sets of phase-shifting areas of the phase-shifting structure will consist of two steps: first, designing the sets of phase-shifting areas of the structure to transform the spatial profile of the input beam into a group of two profiles having separated geometries (different propagation axes or separated lobes); then, designing other sets of phase-shifting areas to perform the profile transformation of the two separate beams into a single combined profile.

Thus, if the component is positioned upstream of the optical fiber, it delays the faster modes by a known amount of time, whereupon such faster modes will propagate in the fiber and will catch up. Conversely, if the component is positioned downstream, it delays the faster modes, which are ahead of the slower modes. And if the component is positioned on the path of the fiber at an intermediate distance between the source and the receiver, it delays the modes that are partly ahead during the travel along the first portion of the fiber to bring them back behind the faster modes, enough for the slower modes and the faster modes to simultaneously reach the end of the second portion of the fiber.

In these three cases, the time delay is, as much as possible, equal to the total length of the fiber multiplied by the average difference in the propagation speed of the two groups of modes. For example, a 1 km-long fiber can cause a difference in the time of propagation of the modes of three nanoseconds, which can be compensated by a 10-cm free-space propagation.

This is, of course, an approximate or partial catching up of a group of modes with respect to another group of modes, if several propagation modes are energized in the fiber.

What has been said for a separation into two groups of modes is also true for a separation into more than two groups. It should also be noted that the separation can be executed in several steps, for example, a separation between a first group and all the other groups, followed by a separation between the first two groups and all the remaining groups, etc. This makes it possible to cumulate more successive delays for a particular mode.

Since the increase in the travel for the faster modes is established in a free space (unguided), the time shift introduced by an additional reflection between the mirrors can be very well controlled, since it depends on the distance between the mirrors and the index of the medium between the same, with such medium possibly being air but, it also could be a transparent solid having a higher index than air.

Figure 2:
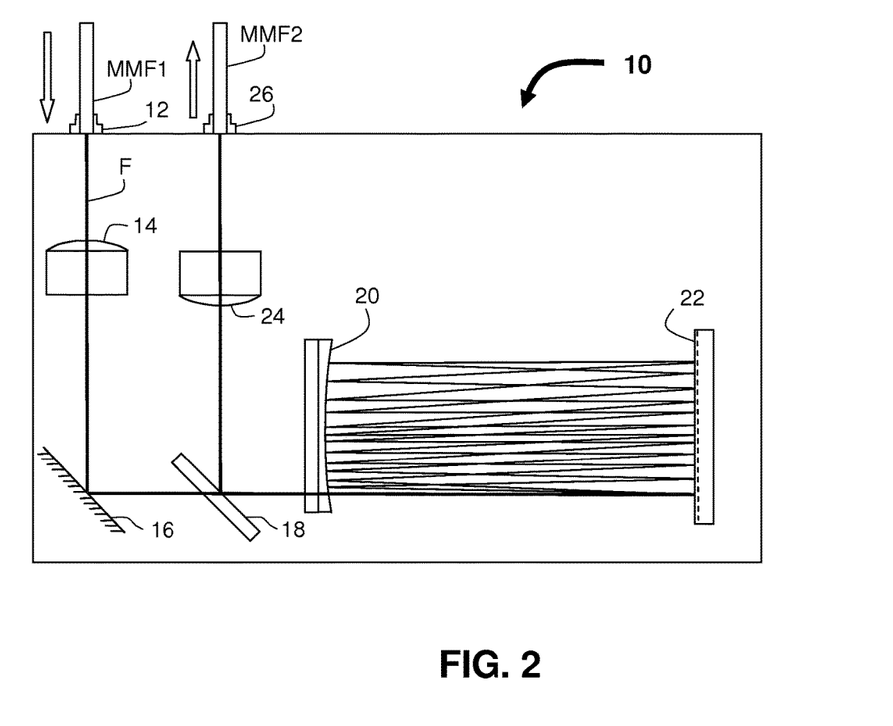
FIG. 2 schematically shows the constitution of an exemplary light beam spatial profile modification optical component.

In FIG. 2, the optical component 10 used in the disclosure has an inlet 12 connected with a multimode optical fiber MMF1, which brings a beam F having an amplitude modulated by digital information. Such beam may pass through optical elements such as lenses 14, reflecting mirrors 16, semi-transparent mirrors 18, and reaches the pair of mirrors providing the multiple reflections.

In this example, a first mirror 20 of such a pair is a spherical mirror and a second mirror 22 is a generally flat mirror, but which is composed, at the scale of the radiation wavelength, of a surface having a relief, the height and depth of peaks and valleys of which define the relative phase shifts to be applied to the beam portions, which hit such peaks and valleys. These heights and depths relative to a median plane, are of the order of the wavelength of the light beam, from a fraction of a wavelength to a few wavelengths. Typically, the wavelength is 1550 nanometers.

As mentioned above, the mirror 22 not only plays the role of a mirror to provide multiple beam travels but also the role of an optical phase-shifting structure of the beam.

The recombined beam leaving the set of mirrors and having undergone a first modification in its spatial profile (separation of groups of modes and a certain number of different reflections) and then a recombination of the different beam portions that have undergone such modifications, is redirected, for instance, by the semitransparent mirror 18 and an optical lens 24, toward an outlet 26 of the component 10, the outlet 26 being connected to a multimode fiber MMF2.

Figure 3:
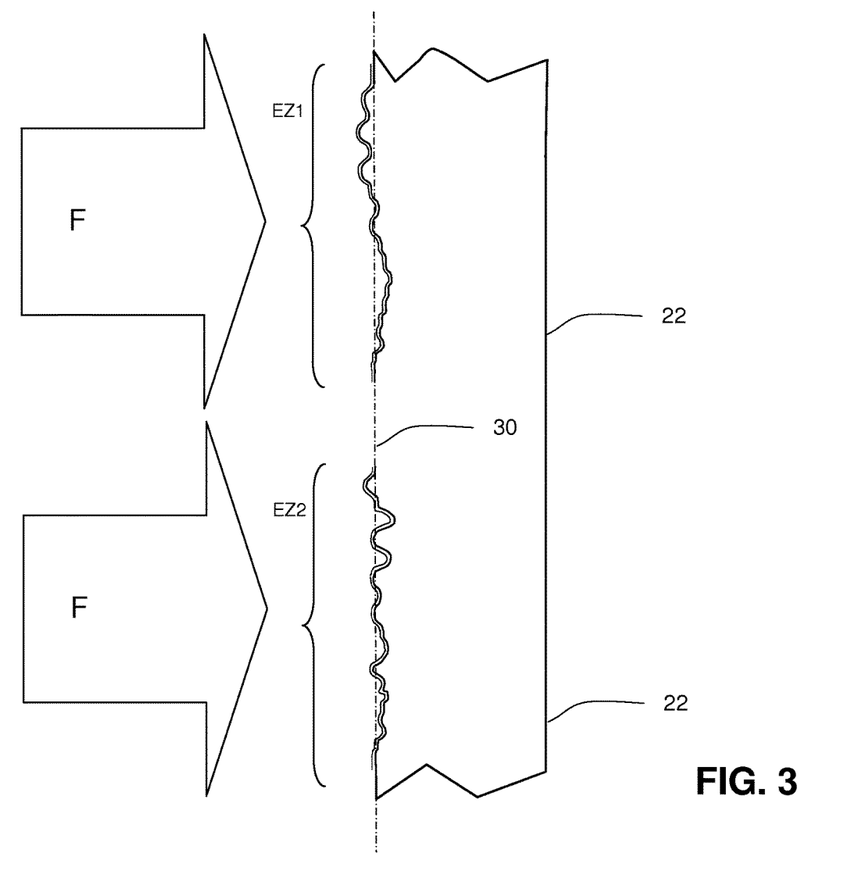
FIG. 3 shows a detail of a generally flat mirror, structured on the wavelength scale to modify a spatial profile of an incident beam.

FIG. 3 shows a detail on a very small scale of the mirror 22, which performs the function of phase-shifting and deflection of the various portions of the section of the beam F. The mirror surface is structured and has a peak-and-valley relief defined relative to a reference plane 30 representing the general surface of the generally flat mirror. The peaks and valleys are elementary phase-shifting areas of the optical phase-shifting structure, which is the mirror. These areas are very small areas, being, for example, less than one micrometer in size so that the incident beam covers many areas, and each elementary portion of the beam section undergoes a respective individual phase shifting. The areas are grouped into sets, the size of which can be that of the section of the light beam, or of the order of such section, and each set establishes a phase-shifting profile that induces a desired intermediate conversion for the spatial profile of intensities and phases of the beam. During multiple reflections between the two mirrors, the beam falls on different sets, each being configured so as to execute a specific transformation. The transformation of the beam profile from a first profile to a second profile is gradual, for example, in seven or eight successive transformations. Each intermediate transformation is achieved by giving the phase-shifting regions, on which the beam must fall, an adequate distribution of punctual phase-shifting of the points of the beam section. The intermediate transformation of the profile is effective after a travel of the beam in a free-space on a few centimeters beyond the passage on the phase-shifting structure. FIG. 3 shows two sets EZ1 and EZ2 of phase-shifting areas that will be reached by the beam during two different travels between the mirrors.

The mirror may consist of a plate structured by lithographic etching and creating peaks and valleys having various heights and depths, with such plate being covered with a thin reflective layer (gold layer in particular) that follows the relief of the etched structure. A generally flat transparent, transmissive and non-reflective structure also structured to establish the desired phase-shifting, could also be used between two simple mirrors, with the possible drawback of increased beam energy losses.

It should be noted that such structure is rigid and must have etching depths so calculated as to reach the desired phase-shifting and deflection effect for each set of phase-shifting areas. A controlled structure (piezo-controlled mirrors or a liquid crystal device) could also be used in special cases.

Figure 4:
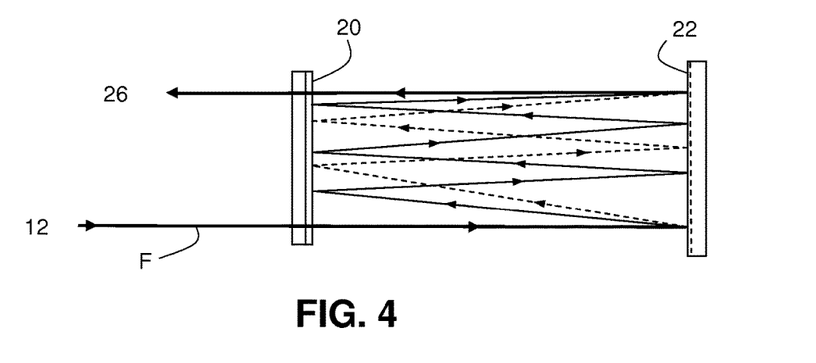
FIG. 4 shows a schematic diagram showing two beam paths corresponding to different propagation modes and undergoing a different number of reflections between the mirrors, prior to being recombined.

FIG. 4 schematically shows the general principle that the beam is split into two portions (but it could be more than two portions) that undergo a certain number of different reflections before being grouped toward the outlet. In the diagram, the mirror 20 has been considered as a flat mirror rather than a spherical one. For readability of the diagram, it was considered that there are only two reflections on the mirror 20 for one portion (dotted line) of the beam and three reflections (solid line) for the other one. In practice, there may be 7 or 8 reflections, respectively, 7 for the slower modes and 8 for the faster modes. For simplification purposes, the figure also shows a different deflection of the two beam portions as from the first reflection on the mirror 22, but the modification in the direction of propagation of the two portions of the beam may significantly occur only after several reflections, when the modifications of the spatial profile of the beam resulted in a sharp enough separation of the different modes or groups of modes initially mixed in the input beam.

Figure 5:
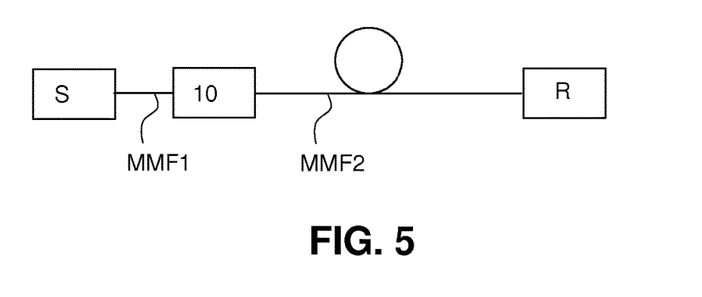
FIG. 5 shows the entire multimode fiber communication device.

FIG. 5 shows the entire communication device intended for transmitting digital information between an optical source S digitally modulated by such information and a receiver making it possible to decode the transmitted digital information. The source S is connected, either directly or through a first short multimode optical fiber MMF1 to the inlet of the optical component 10 described above. The outlet of the component is connected to a multimode output fiber MMF2 having a great length and the same is connected to the receiver R. The component 10 compensates in advance the difference between the average propagation speed of a group of faster modes and the average propagation speed of a group of slower modes in the fiber MMF2, so that the digital information propagated by the different modes will approximately reach the receiver at the same time. Such difference in average speed is known or measurable depending on the fiber type and length.

Figure 6:
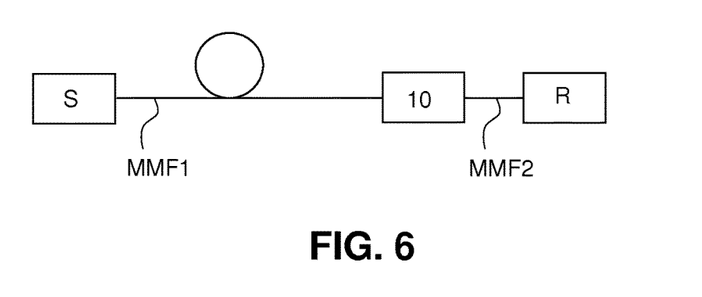
FIG. 6 shows a second exemplary communication device.

FIG. 6 shows an equivalent embodiment wherein the component 10 is located near the receiver and not the source. Then, the first multimode fiber MMF1 is long and the fiber MMF2 is short. Compensation thus occurs after the travel in the long fiber and not before the same and it obviously relates to the average propagation speeds in the fiber MMF1 and not MMF2.

Figure 7:
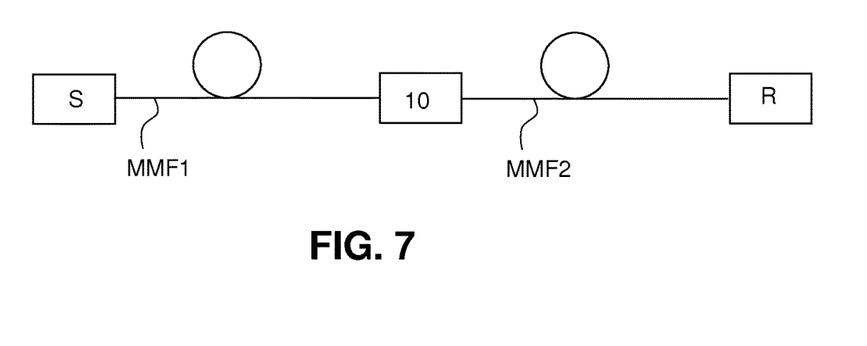
FIG. 7 shows a third exemplary communication device.

FIG. 7 finally shows an embodiment wherein the component 10 is inserted at an intermediate position of the travel between the source and the receiver, for example, in the middle. The fibers MMF1 and MMF2 are long fibers and the component 10 compensates for the sum of influences of the speed differences in propagation in the two fibers.

The invention claimed is:

1. An information transmission system, comprising:
    a multimode optical fiber for insertion between a light radiation source and a receiver, the light radiation source transmitting a multimode light beam that is digitally modulated by information through the multimode optical fiber and to the receiver, the receiver configured for demodulating the information; and
    an optical component for modifying a spatial profile of the multimode light beam, the optical component positioned upstream, downstream, or at an intermediate location along the fiber, the optical component comprising:
        an inlet for receiving the multimode light beam;
        a beam outlet;
        at least two mirrors enabling the multimode light beam to reflect multiple times between the at least two mirrors; and
        an optical phase-shifting structure having several sets of multiple elementary phase-shifting areas, individual phase-shifting profiles introduced by the several sets of multiple elementary phase-shifting areas in each set of multiple elementary phase-shifting areas generating intermediate transformations of the spatial profile of the multimode light beam after the multimode light beam passes through a respective set of multiple elementary phase shifting areas; the intermediate transformations generated by a combination of multiple sets of the multiple elementary phase-shifting areas during the passage of the multimode light beam on the optical phase-shifting structure upon multiple reflections between the at least two mirrors, to form an overall transformation of the spatial profile of the multimode light beam, the overall transformation comprising:
            a) first, a separation of the multimode light beam into several modes or groups of propagation modes having group speeds in different ranges of values, with deflections generated by the several sets of multiple elementary phase-shifting areas being such that a first portions of the multimode light beam corresponding to a mode or a group of modes, the group speeds of which are within a first range of values, undergo, because of the deflections, a number of reflections on the at least two mirrors, the number of reflections undergone by the first portion being different from a number of reflections conferred on second portions of the multimode light beam corresponding to another mode or group of modes having group speeds in a second range of values different from the first range of values; and
            b) then, a combination of the first and second portions of the multimode light beam after these reflections, so as to direct the multimode light beam toward the component outlet.

2. The information transmission system of claim 1, wherein the optical phase-shifting structure comprises at least one mirror of the at least two mirrors.

3. The information transmission system of claim 2, wherein the at least one mirror is a generally flat mirror having a structured surface including multiple reflective areas, the multiple reflective areas positioned at different distances from a reference plane of the generally flat mirror, the different distances defining elementary phase shifts applied to radiation of the multimode light beam that reflects therefrom.

4. The information transmission system of claim 1, wherein the optical phase-shifting structure comprises a structured transparent plate, a thickness of which is modulated over an area thereof so as to achieve a phase shift of radiation of the multimode light beam that passes therethrough.

5. The information transmission system of claim 1, wherein a first mirror of the at least two mirrors is flat or spherical and a second mirror of the at least two mirrors is generally flat, the second mirror having a structured surface configured so as to form the optical phase-shifting structure.

6. A method for transmitting information, comprising:
    digitally modulating a multimode light beam by information at a source;
    transmitting the modulated multimode light beam through a multimode optical fiber and an optical component for modifying a spatial profile of the modulated multimode light beam and to a receiver for demodulating the information;
    wherein transmitting the modulated multimode light beam through the optical component for modifying the spatial profile of the modulated multimode light beam includes:
        reflecting the modulated multimode light beam between at least two mirrors multiple times; and
        using an optical phase-shifting structure to modify the spatial profile of the modulated multimode light beam, the optical phase shifting structure comprising several sets of multiple elementary phase-shifting areas;
    wherein the spatial profile of the modulated multimode light beam undergoes a succession of intermediate transformations induced by the optical phase-shifting structure during the reflections of the modulated multimode light beam between at least two mirrors, the succession of intermediate transformations including:
        a) a separation of the modulated multimode light beam into several modes or groups of propagation modes having group speeds in different ranges of values, with deflections generated by the sets of phase-shifting areas being such that a first portion of the modulated multimode light beam corresponding to a mode or a group of modes, the group speeds of which are within a first range of values, undergo, because of the deflections, a number of reflections on the at least two mirrors, wherein the number of reflections undergone by the first portion is different from a number of reflections conferred on a second portion of the modulated multimode light beam corresponding to another mode or group of modes having group speeds in a second range of values different from the first range of values; and b) then, a combination of the first and second portions of the modulated multimode light beam after these reflections, so as to direct the modulated multimode light beam toward an outlet of the optical component.

7. The method of claim 6, wherein the optical phase-shifting structure comprises at least one mirror of the at least two mirrors.

8. The method of claim 7, wherein the at least one mirror is a generally flat mirror having a structured surface including multiple reflective areas, the multiple reflective areas positioned at different distances from a reference plane of the generally flat mirror, the different distances defining elementary phase shifts applied to radiation of the multimode light beam that reflects therefrom.

9. The method of claim 6, wherein the optical phase-shifting structure comprises a structured transparent plate, a thickness of which is modulated over an area thereof so as to achieve a phase shift of radiation of the multimode light beam that passes therethrough.

10. The method of claim 6, wherein a first mirror of the at least two mirrors is flat or spherical and a second mirror of the at least two mirrors is generally flat, the second mirror having a structured surface configured so as to form the optical phase-shifting structure.

* * * * *